US 6,524,107 B1

(12) United States Patent
Brown

(10) Patent No.: US 6,524,107 B1
(45) Date of Patent: Feb. 25, 2003

(54) APPARATUS AND METHOD FOR DISPLAYING ROOM WALL AND FLOOR COVERING ARRANGEMENTS FOR SELECTION BY A PURCHASER

(76) Inventor: Michael E. Brown, 3682 Decamp Dr., Indianapolis, IN (US) 46226

( * ) Notice: Subject to any disclaimer, the term of this patent is extended or adjusted under 35 U.S.C. 154(b) by 0 days.

(21) Appl. No.: 09/520,869

(22) Filed: Mar. 7, 2000

Related U.S. Application Data

(63) Continuation-in-part of application No. 09/239,385, filed on Jan. 28, 1999, now abandoned.
(60) Provisional application No. 60/073,228, filed on Jan. 30, 1998.

(51) Int. Cl.[7] .............................................. G09B 25/00
(52) U.S. Cl. ............................. 434/72; 434/74; 434/75; 434/76; 434/79; 434/80
(58) Field of Search ............................ 434/72, 74–81, 434/84, 89, 98; 446/82–84, 476–482

(56) References Cited

U.S. PATENT DOCUMENTS

| | | | |
|---|---|---|---|
| 1,246,076 A | | 11/1917 | Fairbanks |
| 2,559,261 A | * | 7/1951 | Schwartz ...................... 434/72 |
| 3,269,034 A | * | 8/1966 | Glass et al. ................... 434/80 |
| 3,392,462 A | | 7/1968 | Everhart |
| 3,412,485 A | * | 11/1968 | Reigler et al. ................. 434/75 |
| 3,468,593 A | | 9/1969 | Catlett |
| 3,945,132 A | * | 3/1976 | Parmelee ...................... 434/76 |
| 3,994,079 A | | 11/1976 | Mirman |
| 4,216,608 A | * | 8/1980 | Walmer et al. .............. 446/110 |
| 4,233,778 A | * | 11/1980 | Lemelson ..................... 46/240 |
| 4,462,066 A | * | 7/1984 | Gibson et al. .............. 362/251 |
| 4,723,820 A | * | 2/1988 | Kroneck .................. 312/138.1 |
| 5,011,446 A | * | 4/1991 | Feinberg ...................... 446/85 |
| 5,647,181 A | * | 7/1997 | Hunts ........................ 52/282.1 |
| 5,688,125 A | * | 11/1997 | Birdsong-Raffo ............ 434/72 |
| 5,749,320 A | | 5/1998 | Sydenstricker |
| 5,876,261 A | * | 3/1999 | Bach et al. .................. 446/105 |
| 5,961,364 A | * | 10/1999 | Bach et al. .................. 446/110 |
| 6,261,147 B1 | * | 7/2001 | Bach et al. .................. 446/105 |
| 6,283,818 B1 | * | 9/2001 | Kushner et al. ............. 446/476 |

* cited by examiner

Primary Examiner—John Edmund Rovnak
(74) Attorney, Agent, or Firm—Woodard, Emhardt, Naughton Moriarty & McNett LLP

(57) ABSTRACT

A device for displaying room wall and floor covering arrangements for selection by a purchaser includes a frame assembly having display panel support members for supporting at least one display panel in a display condition, the frame assembly being configured to resemble, along with at least one supported display panel positioned in the display condition, at least one room; and at least two surface covering display panels being mutually different in at least one appearance or composition characteristic, such at least one appearance or composition characteristic including at least one of color, pattern, material, texture, and geometrical composition.

31 Claims, 10 Drawing Sheets

APPARATUS AND METHOD FOR DISPLAYING ROOM WALL AND FLOOR COVERING ARRANGEMENTS FOR SELECTION BY A PURCHASER

REFERENCE TO RELATED APPLICATION

This application is a continuation-in-part of U.S. application Ser. No. 09/239,385, filed Jan. 28, 1999 which is a continuation-in-part of Provisional Application Ser. No. 60/073,228 filed Jan. 30, 1998.

FIELD OF THE INVENTION

The present invention relates to commercial display apparatuses and more particularly to an apparatus and method for displaying room wall and floor covering arrangements for consideration and selection by a purchaser.

BACKGROUND OF THE INVENTION

Few people can claim to be totally satisfied with the sample books, brochures, papers and other devices retailers provide to help consumers select wallpaper, paint, paneling, and other home and office decorating materials. The same is true in connection with floor coverings. Carpet and tile samples must be viewed either in the store or checked out and transported home for consideration and comparison. Such samples are awkward to transport and are time consuming to use as the samples in the first batch taken home, and often in the second, third and fourth batches taken home, are usually just not quite right. They must then be returned in favor of another batch of samples to repeat the process. Even then, the often two-foot square or larger samples are difficult to envision covering the entire floor of the intended room or to envision how they will look with furniture or a particular covering.

Retailers dislike such samples, too, as they take up a great deal of space and must be accounted for when they are checked out. Moreover, customers often browse from store to store first without taking samples home to try. For the retailer, the likelihood of consummating a sale diminishes greatly as soon as the customer leaves the store.

In addition, when comparing paint or wallpaper samples with carpeting or tile samples, a matching of samples is all that is accomplished. And while a skilled interior designer can adeptly visualize and assemble such samples into workable arrangements, the do-it-yourselfer may not want or be able to pay the cost of an interior designer. Consequently, he may have no clue as to the change in the overall appearance of the room he has effected as a result of his wall or floor covering selections, until it's too late.

Paint samples are notoriously weak visual aids. Gradations of color on paper strips are too small and run together visually when held against the much larger wall surface. This makes it difficult to pick a desirable color. Lighting variations make the problem all the worse. Whether dealing with wallpaper, paneling, paint, tile, carpeting, linoleum, or wood, colors appears differently from one lighting source to another. Thus, an elaborate wall and floor covering color scheme arrangement created in a large store with bright fluorescent lighting often looks markedly different when those items are later installed in the home.

With the explosion of computer technology has come the "virtual" solution—a computer simulation of a room where the user can mix and match various wall and floor colors, and to some extent textures and patterns, to better visualize design arrangements. While this solution has a number of benefits, the user is still limited to a virtual image that lacks tactile input; that is, the ability to "feel" the materials. Moreover, it is still "virtual". Even with the impressive improvement in computer technology, computer graphic renderings are simply not as good as the real thing.

What is needed is an improved system for providing wall and floor covering examination and selection for the consumer that is cost efficient for both the retailer and the consumer, is easy to use, and better assists the consumer in envisioning a variety of wall and floor covering combinations installed in the home or office.

SUMMARY OF THE INVENTION

Generally speaking, an apparatus is provided to allow a purchaser to select, view and evaluate different wall and floor covering samples in a scaled-down room of a scaled down house or similar structure.

A device for displaying room wall and floor covering arrangements for selection by a purchaser includes a frame assembly having display panel support members for supporting at least one display panel in a display condition, the frame assembly being configured to resemble, along with at least one supported display panel positioned in the display condition, at least one room; and at least two surface covering display panels being mutually different in at least one appearance or composition characteristic, such at least one appearance or composition characteristic including at least one of color, pattern, material, texture, and geometrical composition.

It is an object of the present invention to provide an improved retail display device.

It is another object of the present invention to provide an improved device for facilitating the selection and evaluation of a variety of wall and floor covering samples.

Further objects and advantages of the present invention will become apparent from the following description of the preferred embodiment.

DESCRIPTION OF THE PREFERRED EMBODIMENT

Figure 1:
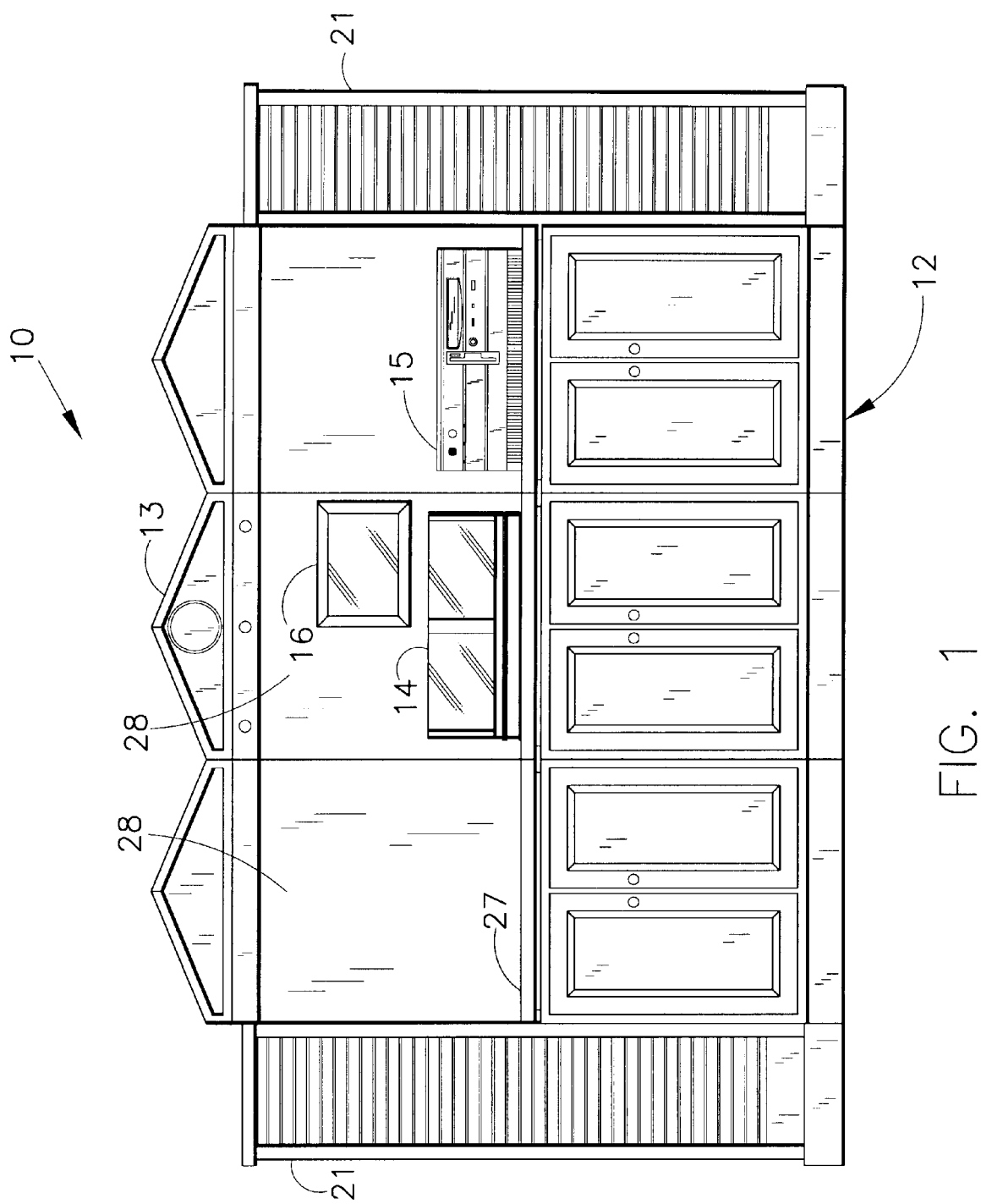
FIG. 1 is a front, elevational view of the an apparatus 10 for displaying room wall and floor covering arrangements for selection by a purchaser in accordance with the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and any alterations and further modifications in the illustrated apparatus, and any further applications of the principles of the invention as illustrated therein are contemplated as would normally occur to one skilled in the art to which the invention relates.

Figure 2:
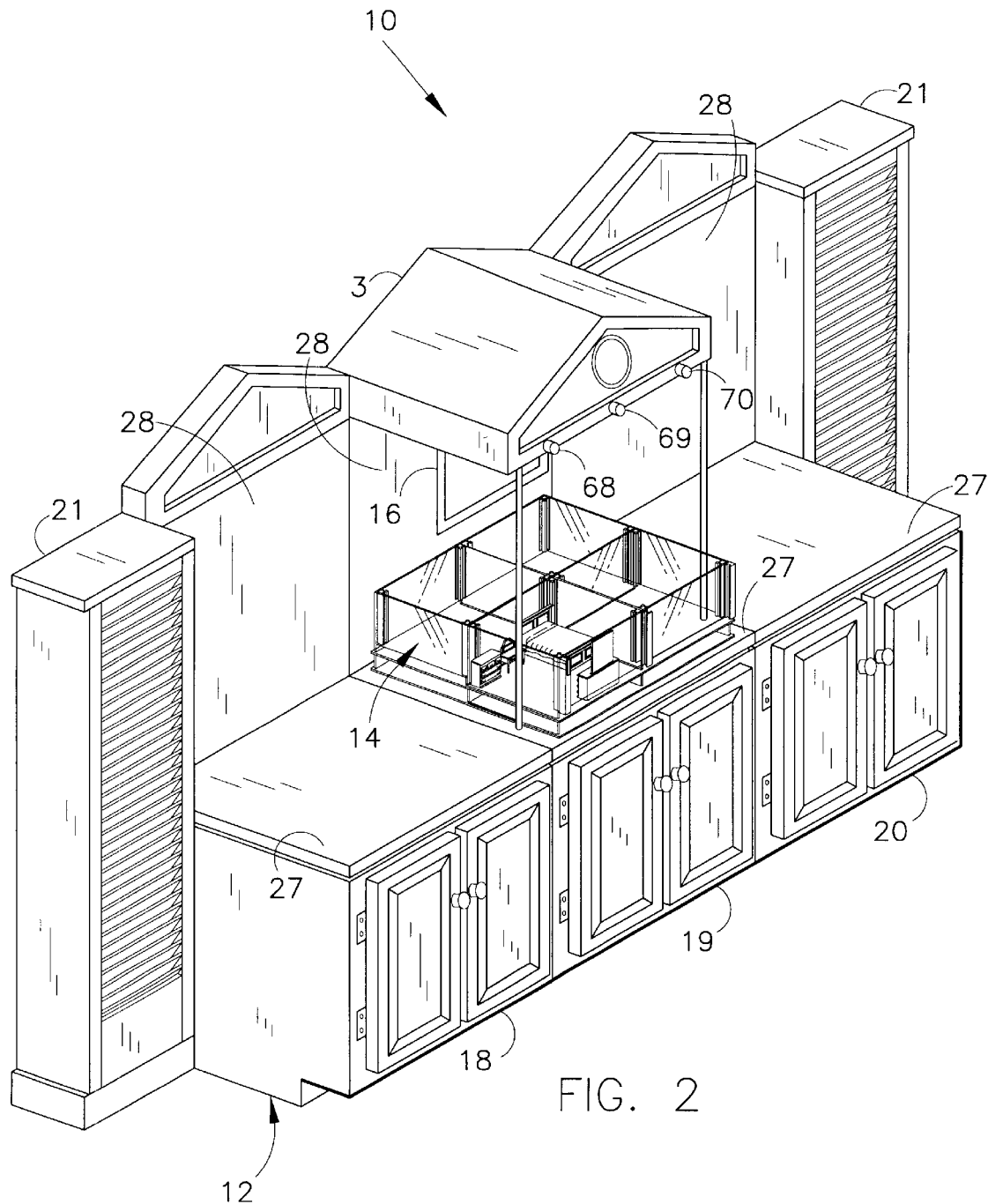
FIG. 2 is a perspective view of the apparatus 10 of FIG. 1 and shown without computer 15.

Referring to FIGS. 1 and 2, there is shown an apparatus 10 for displaying room wall and floor covering arrangements for selection by a purchaser in accordance with the preferred embodiment of the present invention. Apparatus 10 generally includes a cabinet assembly 12, a canopy 13, a display frame assembly 14, a computer 15, a monitor 16, and a lighting assembly 17 (FIG. 10) that is housed within canopy 13. The configuration of cabinet assembly 12 may vary to provide an aesthetically pleasing and ergonomically efficient design. Cabinet assembly 12 generally includes three cabinet modules 18–20 arranged side by side and a pair of storage units 21, which are positioned on opposite sides of modules 18–20. Storage units 21 are each configured with a plurality of angled shelves or similar structure to receive and hold the variety of wall covering display panels 22, floor covering panels 23, and exterior facade display panels 24, as described herein.

Each module 18–20 has a countertop 27 and has a back wall 28 that extends upwardly therefrom. Canopy 13 is connected at the top of wall 28 of center module 19 so that canopy 13 extends over the countertop 27 of center module 19, as shown. Frame assembly 14 is positioned atop counter 27 of center module 19, as shown.

Computer 15 may comprise any appropriate data processing unit, such as a Pentium class PC that functions as described herein. It is preferred that computer 15 have a CPU that is near the top of the state of the art in processing power and clock speed and have sufficient fixed and volatile memory to process the data and input with maximum speed. Monitor 16 has a touch sensitive screen capability so that it can display a visual output from computer 15, but also so that data may be entered by way of touching or nearly touching the screen of monitor 16. Such technology is well known in the art. It is contemplated that other input devices such as a standard or specially designed keyboard or mouse may be used, but the touch sensitive screen for monitor 16 is preferred. Monitor 16 is mounted in back wall 28 of center module 19, but may be mounted in any of the back walls 28, may comprise a standard CRT monitor, with touch screen capabilities, set atop computer 15, or may be any appropriate monitor mounted or positioned for access by the customer and/or retailer.

Figure 3:
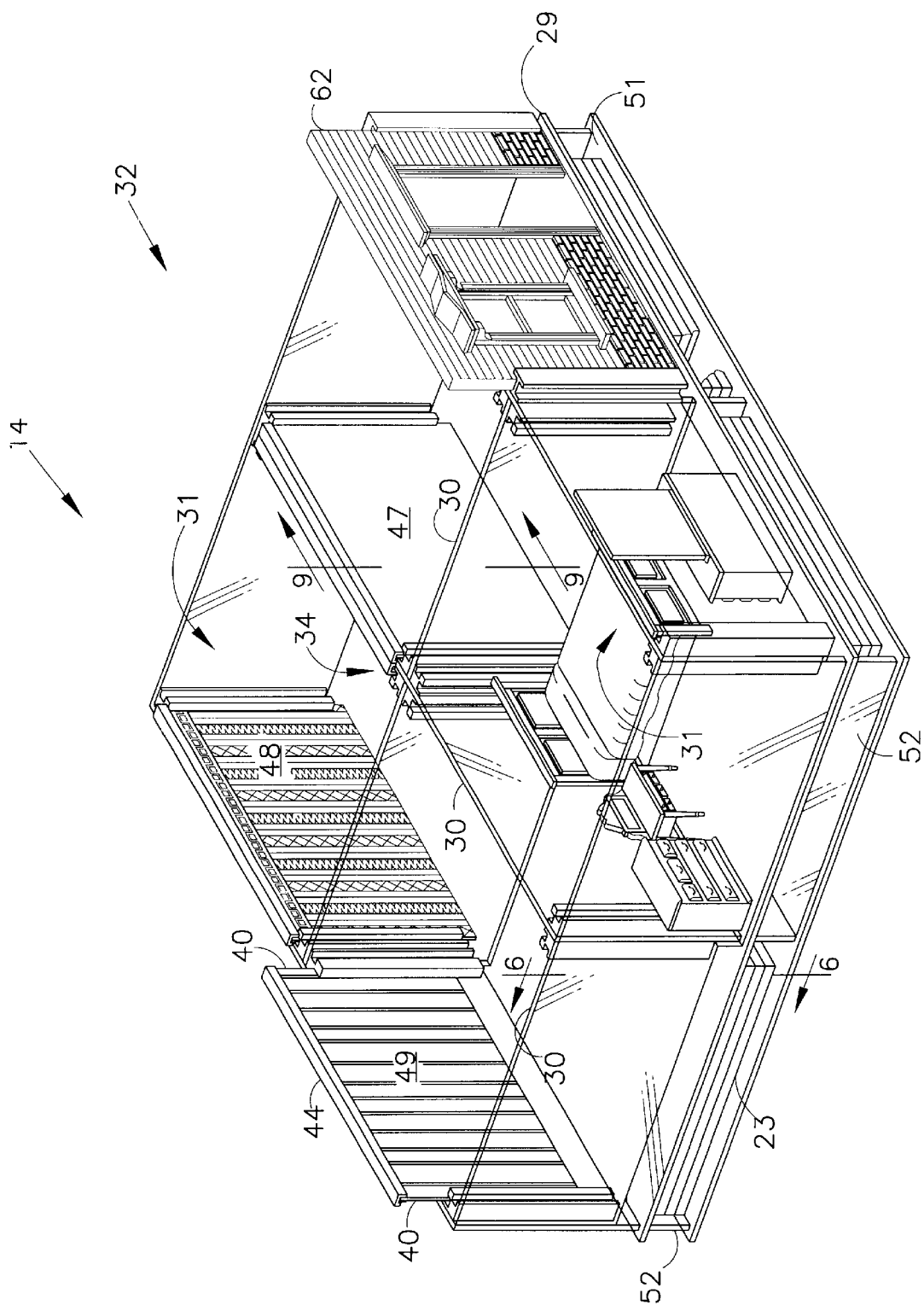
FIG. 3 is perspective view of frame assembly 14 of the device 10 of FIG. 1 and showing wall, floor and exterior facade display panels positioned for viewing.
Figure 4:
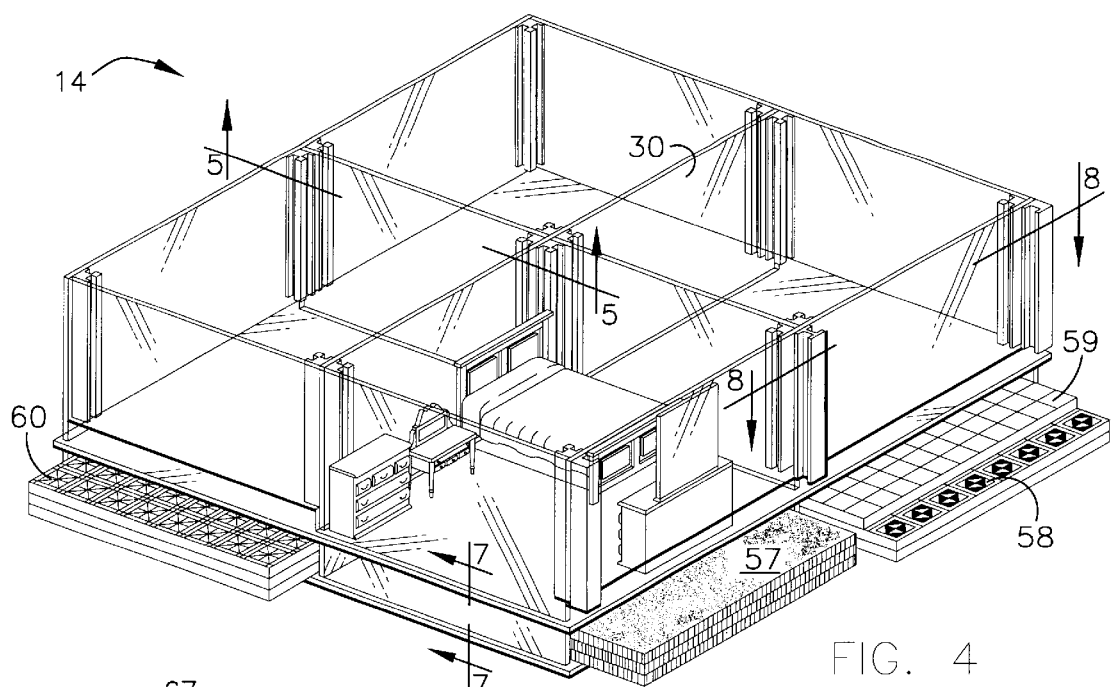
FIG. 4 is a perspective view of the frame assembly 14 of FIG. 3 showing a variety of floor covering display panels inserted therein.

Referring to FIGS. 3 and 4, display frame assembly 14 has a floor 29 and walls 30 extending upwardly therefrom. Frame assembly 14 is made of a rigid, transparent material such as acrylic, and walls 30 may be integrally formed with floor 29 or affixed to floor 29 in any appropriate manner. In one embodiment, walls 30 are rigidly secured to floor 29 using known techniques for bonding plastics. Walls 30 are sized and arranged to define a number of rooms 31, frame assembly 14 thereby simulating a scaled-down house 32, as shown in FIG. 3. Furniture may be positioned in one or more of rooms 31 to simulate particular rooms, such as a bedroom, bath, etc. The present invention is directed mainly to home interior wall and floor covering arrangements. However, its application is contemplated to extend to both interior and exterior coverings and to homes, commercial buildings and any other structure with walls, floors and similar structures that are desired to be covered or decorated. Thus, use of phrases herein such as "room surface covering arrangements" and "home interior wall and floor covering arrangements" are intended to include any wall or floor or similar structure to which a covering or decoration is desired to be applied. Such language is also intended to include and mean, and the present invention further contemplates, such display panels representing the composition of such surfaces. That is, the present invention is not to be limited to just coverings. An existing wall may be "covered", for example, by wallpaper or a brick veneer, or a new wall may be substantially constructed of brick, as first envisioned by apparatus 10.

Referring to FIGS. 3–5 and 8, frame assembly 14 further includes a plurality of channel members 34 secured at each corner of each room 31 and extending adjacent to and along the height of each wall 30. Each channel member 34 defines a pair of slots 35 that extends along the height of each channel member 34, each pair of slots 35 being disposed 90 degrees apart so that each slot 35 of each channel member 34 opens facing a slot 35 of a channel member 34 at an adjacent corner of a room 31. For example slots 36 and 37 open towards each other (see FIG. 5). Channel members 34 are formed from the same transparent material as walls 30 and floor 29 so as not to detract aesthetically from device 10. Transparent acrylic is the preferred material for walls 30, floor 29, and channel members 34 as it has desirable mechanical and physical properties during and after manufacture.

Figures 9, 11:
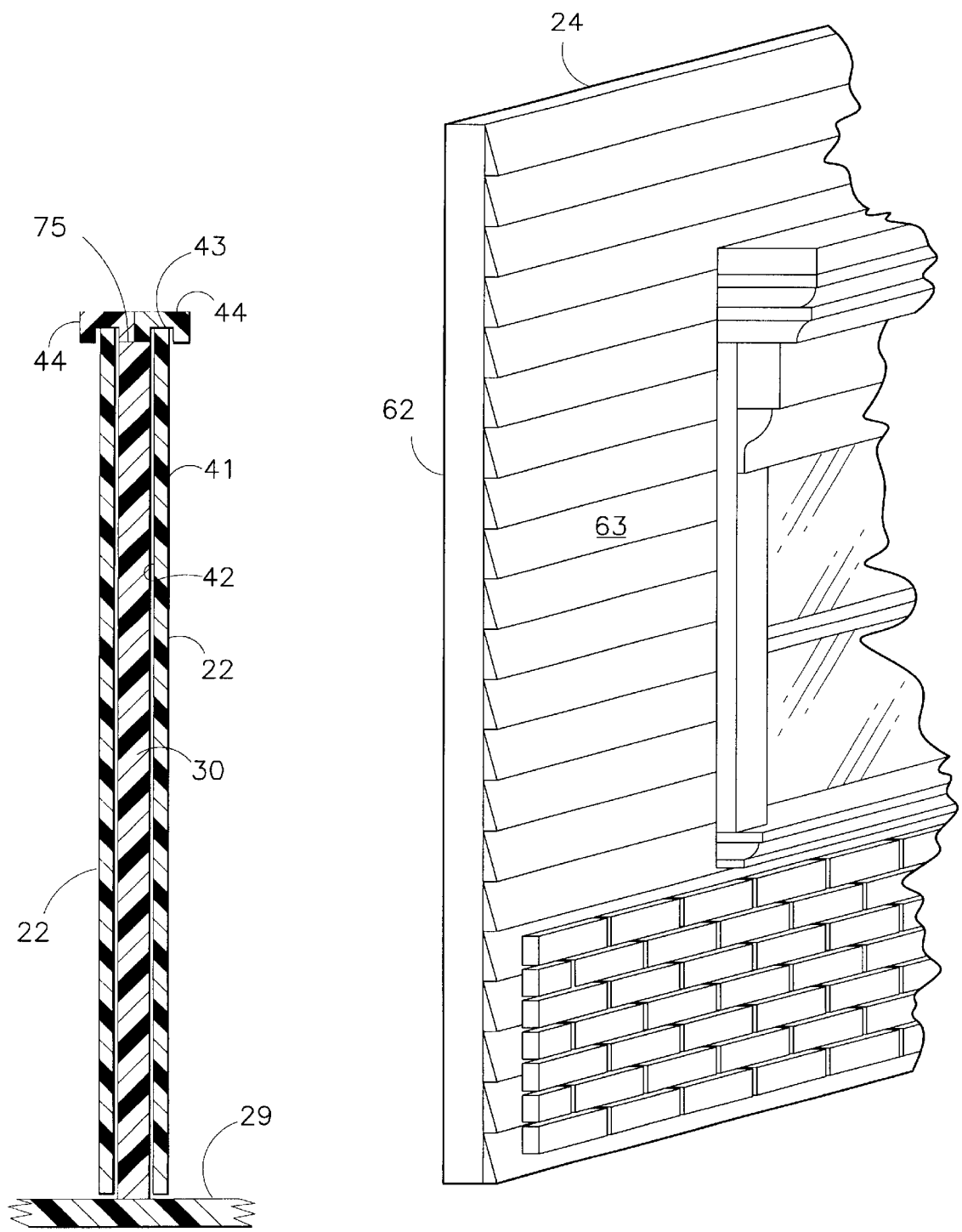
FIG. 9 is a cross sectional view of a portion of frame assembly 14 of FIG. 3 taken along the lines 9—9 and viewed in the direction of the arrows, and showing two wall covering display panels 22 secured on opposite sides of a wall 30.
FIG. 11 is a sectional perspective view of one embodiment of an exterior facade display member 24 of the present invention.

Referring to FIGS. 3 and 9, wall covering display panels 22 each have opposite side edges 40, opposing sides 41 and 42, a top edge 43, and a tab 44 extending along top edge 43. Each opposing side 41 and 42 of each wall covering display panel 22 is covered with a different wall covering. Examples of such wall coverings include: paint 47, wallpaper 48, and wood 49. Any other wall covering (such as plastic, vinyl, brick, stucco, etc.) that one might think of to cover, comprise or decorate a wall is also contemplated as are two or more combinations of different wall coverings. For example, one panel 22 may have a lower half of a side 41 covered with wood paneling with the top half of that same side 41 covered in wallpaper. Furthermore, it is desired that one side 41 of a panel 22 be covered with a wall covering or a combination of wall coverings while the opposite side 42 be covered with a different wall covering or a different combination of wall coverings, thus enabling each panel 22 to display two different coverings.

Alternative embodiments are contemplated where wall covering display panels 22 comprise a semi-rigid panel (not shown), and the wall coverings are contained separately from such panel. For example, instead of sample storage units 21, device 10 would include a collection of paper or paper board wall covering samples that are sized to be applied to and held by the semi-rigid panel. The semi-rigid panel may be like a standard clipboard with a spring bias clipping mechanism (not shown). A complimentary shaped and sized wall covering sample (similar to those found in standard wallpaper sample books) is applied to the panel and held by the spring biased clip. The semi-rigid panel and the wall covering sample applied thereto may then be slid into the complimentary shaped slots 35 in frame assembly 14 in the same manner as described for wall covering display panels 22.

Another alternative embodiment is contemplated wherein the wall covering display panel comprises a clear plastic "folder"—a generally rectangular, plastic plate folded upon itself to form a generally flat, but U-shaped holder. The two panels of such holder may be separated by slightly stressing the panels apart, and a wallpaper sample may be slid therebetween. Upon releasing the two panels, the panels spring back together and hold the wallpaper sample therebetween. The U-shaped transparent holder with the wallpaper visibly sandwiched therebetween may then be positioned within the slots 35 on the frame assembly and viewed as discussed herein for wall covering display panels 22.

Another alternative embodiment contemplates wallpaper samples that, instead of being printed on the standard non-rigid paper commonly found in wallpaper books, are instead printed on a semi rigid cardboard material or the like. This configuration enables each wallpaper sample to be a very thin, lightweight member that can be selected from a book or file, as such a card file, lifted and dropped into the 35 slots for viewing.

It is contemplated with each of the embodiments described or suggested herein that optimum results will be obtained by such wallpaper samples, paneling samples, and the like, being manufactured roughly to the scale of the frame assembly; that is, sized to simulate the scaled down house 32. For example, for a wallpaper sample usable in device 10 where the wall 30 is six inches high, the pattern on the wall covering sample would be reduced to a scale of 16:1. Alternatively, the scale of the pattern could be some value between 1:1 and 16:1 so that the pattern of the wall covering is close to the same scale as room 31 and the furniture, but large enough for the consumer to perceive and appreciate the actual print pattern. The preferred arrangement of wall panels for insertion into frame assembly 14 includes semi rigid cards bearing on one side the wall covering sample (e.g. wallpaper) in its actual size (i.e. at a 1:1 ratio). The opposite side of such card bears the same wall covering, but in a smaller scale, approximately that of or slightly greater than the scale of the rooms 31 of frame assembly 14 (e.g. 16:1 or perhaps 10:1).

Frame assembly 14 includes a base 51 that is rigidly connected to the underside of transparent floor 29 by a plurality of transparent short walls 52. Floor 29, base 51 and short walls 52 combine to create a number of rectangular cavities 53 for receiving floor covering panels 23. J-shaped, longitudinal flanges 54 extend inwardly from short walls 52 and into cavities 53 to provide support for thin floor covering display panels 23. Panels 23 may consist of structured panels covered in a real or simulated floor covering material, such as carpeting 57, linoleum 58, refractory or ceramic tiles 59, wood 60 (FIGS. 3 and 4) or any other suitable floor material, for example, cork (not shown). Alternatively, floor covering panels 23 may consist of a section of the actual floor covering material itself, such as a small square of carpeting. The choice of composition of the panels 23 will depend on factors such as dimensions of the actual floor covering (certain carpet piles may be too thick to fit within cavity 53) and the appearance of the scaled down sample as compared to such sample in full scale (in patterned tiles, the pattern may not be readily perceptible scaled down to 16:1 size, for example).

Referring to FIGS. 3 and 11, each exterior facade display panel 24 has opposing side edges 62 and an exterior facade 63 secured to at least one side face. Exterior facades 63 are formed from balsa wood and other known modeling materials using techniques known by 315 skilled artisans to produce scaled-down versions of windows, siding, brick, and so forth.

It is intended that color, style, and other information pertaining to the various wall coverings, floor coverings, and exterior facades be obtained from the manufacturers of these materials. As for color selections, most manufacturers maintain color correct computer data corresponding to their particular inventory. It is this information, or information substantially equivalent to it, that is intended to be incorporated into device 10.

Figure 10:
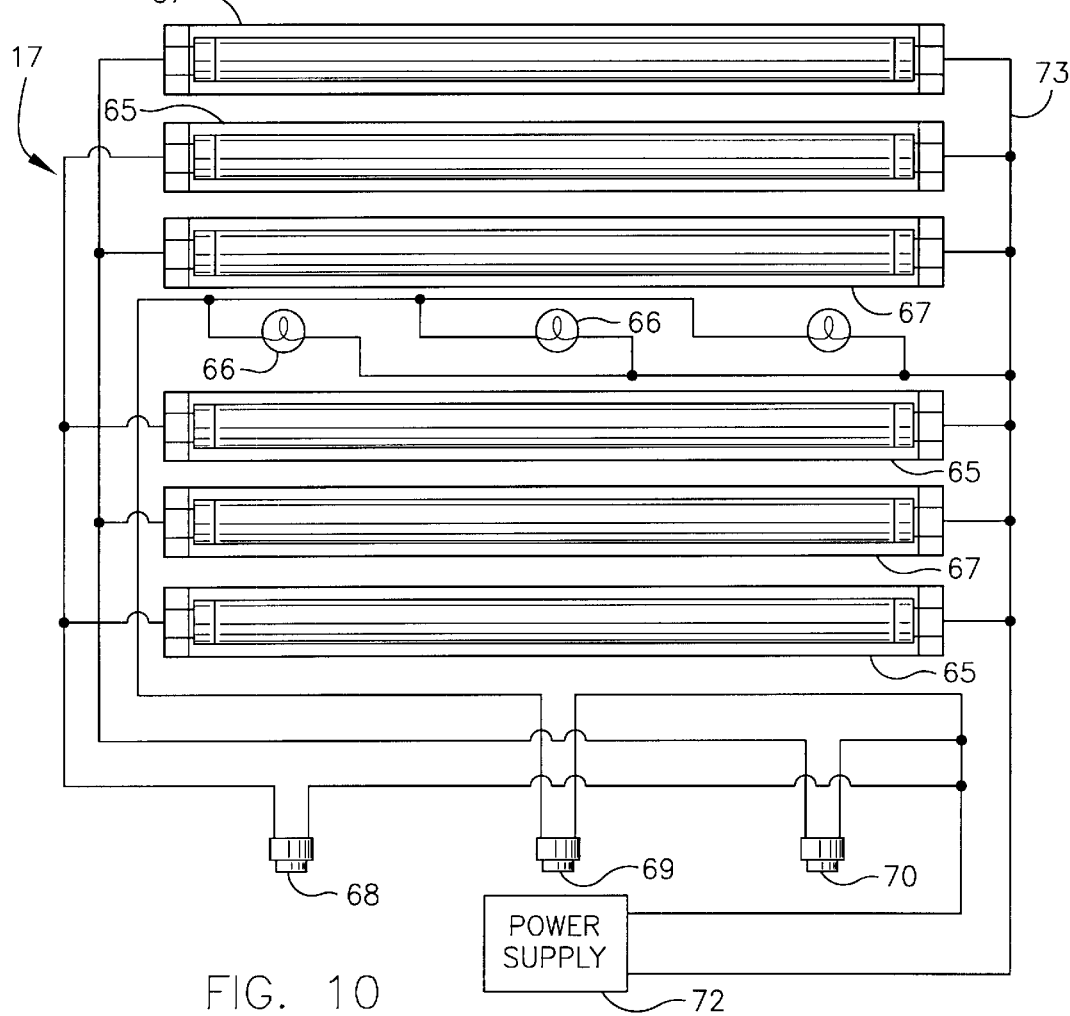
FIG. 10 is a diagrammatic view of the lighting assembly 17 of the present invention, and showing two wall covering display panels 22 secured on opposite sides of a wall 30.
Figure 5:
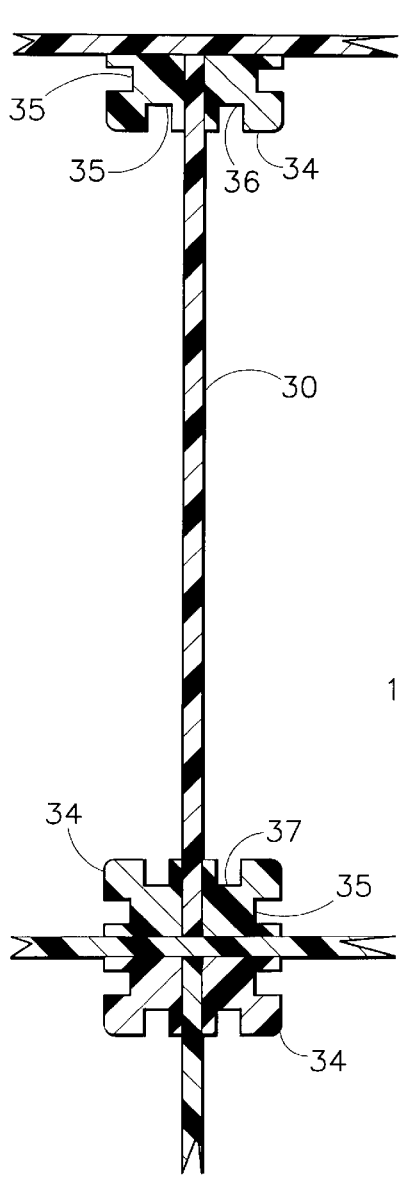
FIG. 5 is a cross sectional view of a portion of frame assembly 14 of FIG. 4 taken along the lines 5—5 and viewed in the direction of the arrows.
Figure 6:
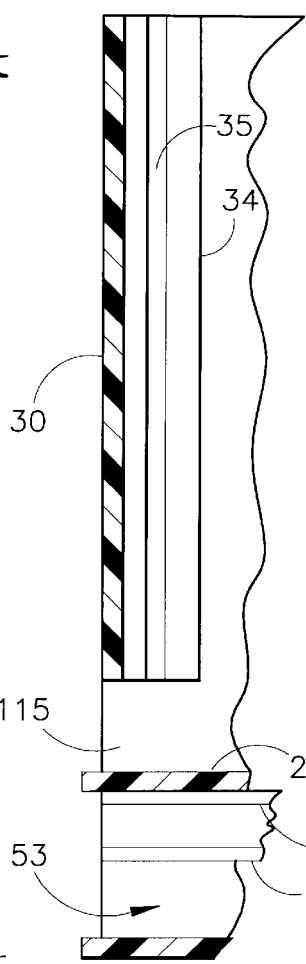
FIG. 6 is a cross sectional view of a portion of frame assembly 14 of FIG. 3 taken along the lines 6—6 and viewed in the direction of the arrows.
Figure 7:
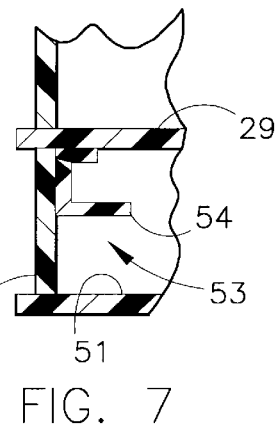
FIG. 7 is a cross sectional view of a portion of frame assembly 14 of FIG. 4 taken along the lines 7—7 and viewed in the direction of the arrows.
Figure 8:
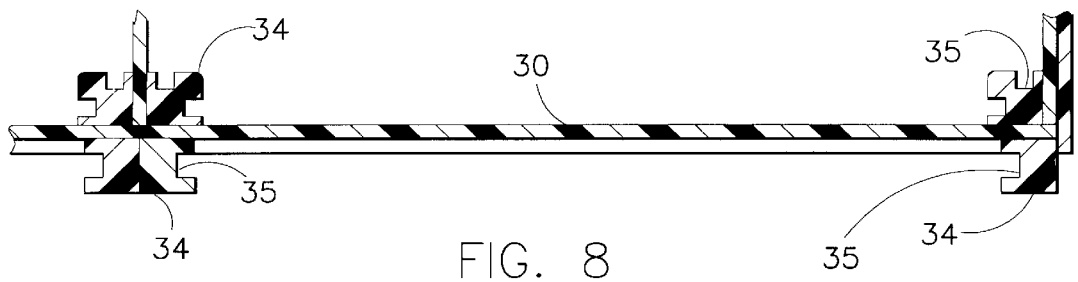
FIG. 8 is a cross sectional view of a portion of frame assembly 14 of FIG. 4 taken along the lines 8—8 and viewed in the direction of the arrows.

Referring to FIGS. 3 and 10, lighting assembly 17 is housed within canopy 3 and includes a fluorescent light source 65, an incandescent light source 66, a natural light source 67 and a number of switches 68, 69 and 70 connected with light sources 65, 66 and 67, respectively, and with a power source 72 by wiring 73. Power source 72 may be simply a plug for plugging into a standard electrical outlet, or it may be a battery, which would enhance the portability of device 10. Switches 68–70 are wired to enable the selective activation of any combination of light sources 65–67. Thus, for example, incandescent light source 66 may be turned on by switch 69 to the exclusion of light sources 65 and 67 to visualize the wall and floor panel arrangement in frame assembly 14 under incandescent light. Also, more than one of light sources 65–67 may be turned on at one time. Switch 69 may be a rheostat to vary the intensity of the incandescent light. In one embodiment, the natural light source 67 comprises fluorescent bulbs having a slightly different color value than the bulbs of fluorescent light source 65 to closely simulate "natural" light. Alternative embodiments are contemplated wherein light sources 65–67 may vary in number, type, color and intensity, the overall intent being to provide a variety of different lighting sources directed to frame assembly 14 and the wall, floor and exterior facade panels 22–24 applied thereto.

A system for organizing and identifying all the available selections (wall covering display panels 22, floor covering display panels 23, and/or exterior facade display panels 24) is provided to help narrow and identify the purchaser's preferences. An organizational system whereby the locating information consists of catalogue lettering or style numbers corresponding to particular wall covering display panels 22, floor covering display panels 23, or exterior facade display panels 24 is used herein for illustration of one manner of use of device 10.

With reference to all of FIGS. 1–15, the method of displaying room surface wall and floor covering arrangements for selection by a purchaser will now be described. It should be understood that selecting a wall covering, a floor covering, and an exterior facade arrangement need not occur in any particular order.

In connection with the wall covering arrangement selection process, the purchaser chooses a wall covering display panel 22 from storage unit 21. Wall covering display panel 22 is designed to be easily manageable and interchangeable within frame assembly 14. Slots 35 align with and receive side edges 40 of display panel 22, and display panel 22 is lowered downwardly until tab 44 rests on the top 75 of wall 30. (Alternative embodiments contemplate panels 22 having no tab 44. A panel is then lowered within slots 35 until its bottom edge rests upon floor 29.) Rooms 31 that share a common wall present no problem, since tabs 44 are sized to extend over only half the width of top 75 of wall 30, as shown in FIG. 9. Once secured in position, the wall covering, such as wallpaper 48, may be viewed directly and through transparent wall 30 (See FIG. 3).

Figure 12:
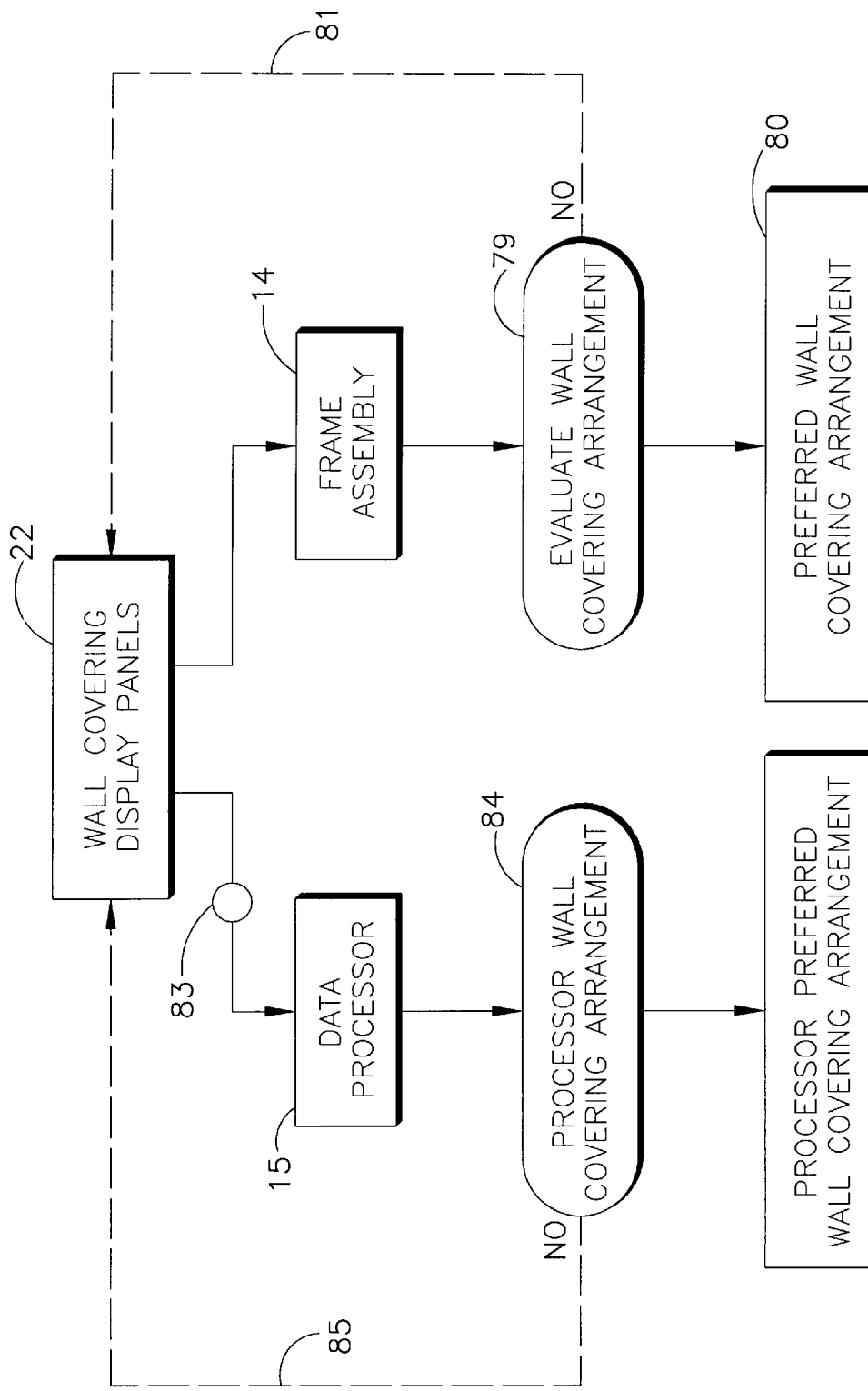
FIG. 12 is a diagram showing the wall covering arrangement selection process of the present invention.

Referring to FIG. 12, there is shown the wall covering selection process, which may include the use of a computer 15. A wall covering display panel 22 is selected from the collection of panel samples held by storage units 21, or by books, boxes or the like, and is inserted into frame assembly 14. At this point, the user evaluates the sample (at 79) and decides whether it is the preferred wall covering 80, or whether to temporarily reject the current sample and try another (represented by dashed line 81). One wall covering display panel 22 may be interchanged in frame assembly 14 with another display panel 22 as many times as necessary or desired, until the purchaser selects a preferred wall covering arrangement 80.

The computer or data processor 15 of device 10 provides the purchaser with selections made by a professional interior designer. Designer selections are stored within data processor 15 and retrieved in response to data 83 entered by the purchaser. Data 83 corresponding to any one particular wall covering is entered either through touch screen capable monitor 16 or a keyboard or other input device (not shown) or even remotely. In such case, computer 15 would be internet accessible and contain software enabling the purchaser to access the information on computer 15 and to enter desired wall and floor covering selection data 83. Such data 83, entered remotely or on site, produces designer wall covering arrangements, which is also referred to herein as processor wall covering arrangements 84, in response. For example, the purchaser enters data corresponding to a particular striped wallpaper and requests from the processor three color selections of the subject wallpaper that provide a "warm" overall color scheme. The purchaser may obtain from the processor the catalogue or style numbers for the wall covering display panels 22 that have three "warm" color variations of the subject wallpaper secured to them. The purchaser may then secure those wall covering display panels 22 in frame assembly 14 and view the overall impression that such particular processor wall covering arrangement 84 makes. This data entering step may be repeated, (indicated at 85), as many times as necessary, until the purchaser obtains from processor 15 his or her processor preferred (designer) wall covering arrangement 86. The floor covering arrangement selection process (See FIG. 13) follows the same steps as set forth above with respect to the wall covering arrangement selection process.

Referring to FIGS. 3, 4, 6, and 7, floor covering panels 23 are inserted, as desired, into cavities 53 of assembly 14, beneath transparent floor 29, so that they may be visible through floor 29. Different thicknesses of floor covering display panels 23 are accommodated by the J-shaped longitudinal flanges 54. Flanges 54 support thin floor coverings, such as linoleum, so as to position them closer to the surface of floor 29 so the purchaser can more effectively evaluate its overall appearance. The size of cavities 53 and the positionment of J-shaped flanges 54 may be created so that multiple floor covering panels 23 may then be pulled away one at a time from within the cavity 53 to suddenly reveal remarkable changes in the overall appearance of the corresponding room 31.

Figure 13:
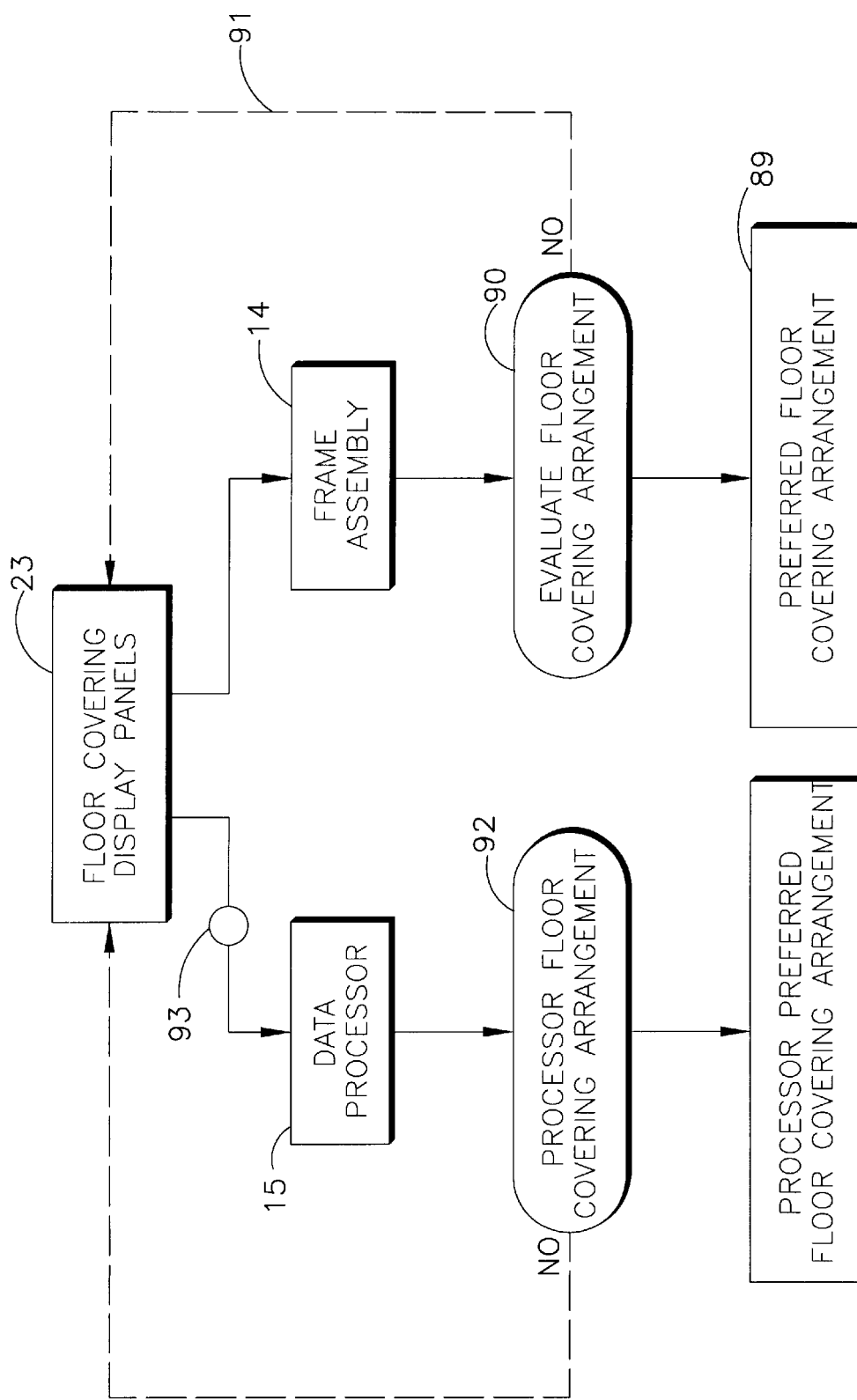
FIG. 13 is a diagram showing the floor covering arrangement selection process of the present invention.

As with wall covering display panels 22 and with reference to FIG. 13, whether independently, or in conjunction with wall covering display panels 22, a floor covering display panel 23 may be interchanged with other floor panels 23 as many times as necessary or desired, until the purchaser selects a preferred floor covering arrangement 89. As with wall panels 22, a floor covering panel 23 is selected from storage units 21, books, boxes or the like and is inserted in frame assembly 14. At this point, the user evaluates the sample (at 90) and decides whether it is the preferred floor covering 89, or whether to temporarily reject the current sample and try another (represented by dashed line 91). This process may continue until the purchaser selects a preferred floor covering arrangement 89.

The data processor 15 of device 10 is also programmed to provide floor covering selections made by a professional interior designer and are referred to herein as processor floor covering arrangements 92. Like the wall covering example above, processor floor covering arrangements 92 are based on data 93 the purchaser enters that corresponds to any one of the floor coverings 23. For example, the purchaser enters data corresponding to a particular linoleum with an overall color and texture that the purchaser finds desirable. The purchaser requests from the processor (interior designer) design configurations that have traditional geometric shapes, but that include the desired overall texture and color. The purchaser may obtain from the processor some of the catalogue or style numbers for the floor coverings 23 that have traditional geometric shapes and the overall texture and color the purchaser found desirable. The purchaser may then position those floor coverings 23 in frame assembly 14 to view the overall visual impression the particular processor floor covering arrangement 92 makes. This data entering step may be repeated as many times as necessary, until the purchaser obtains from processor 15 a processor preferred (designer) floor covering arrangement 95.

Figure 14:
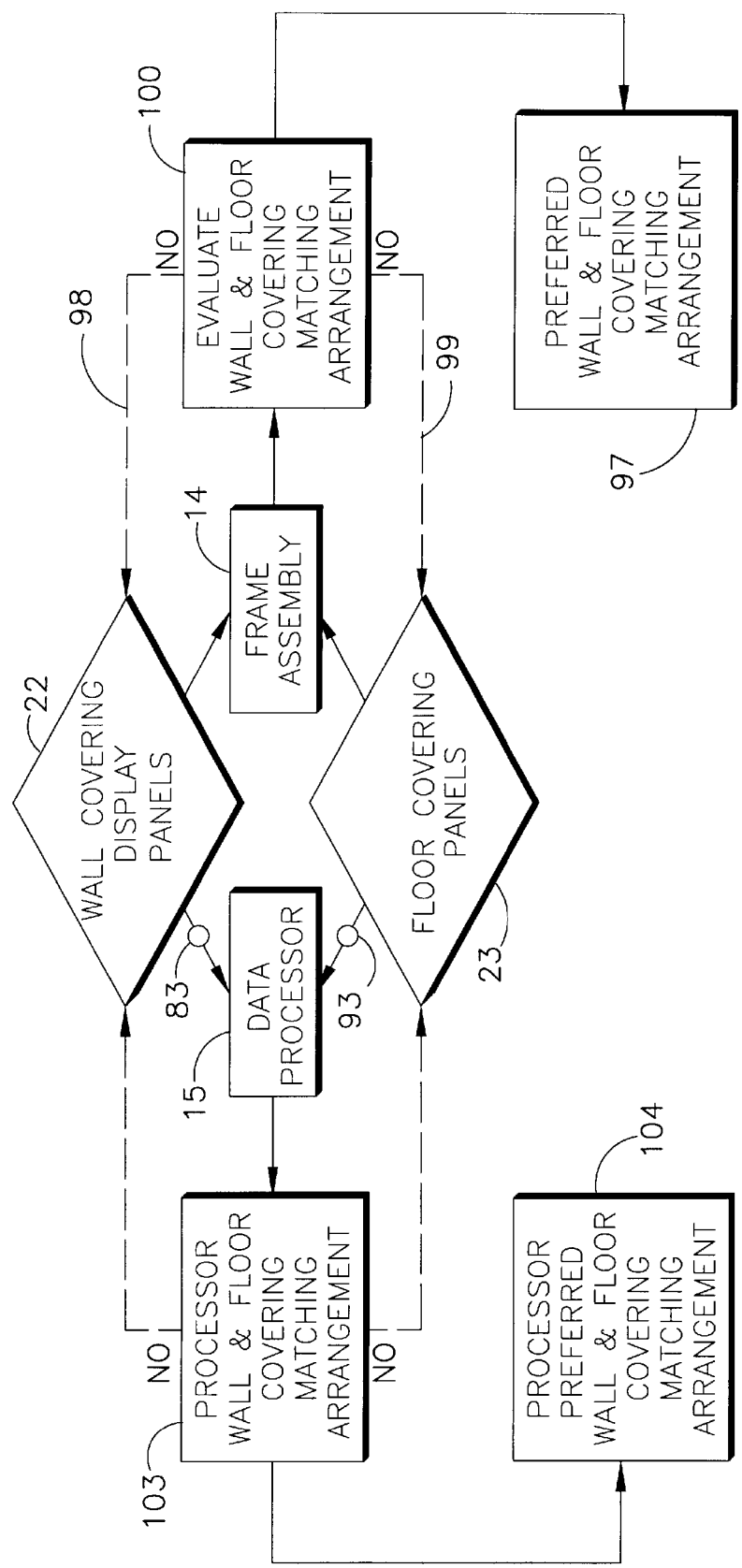
FIG. 14 is a diagram showing the wall and floor covering matching arrangement selection process of the present invention.
Figure 15:
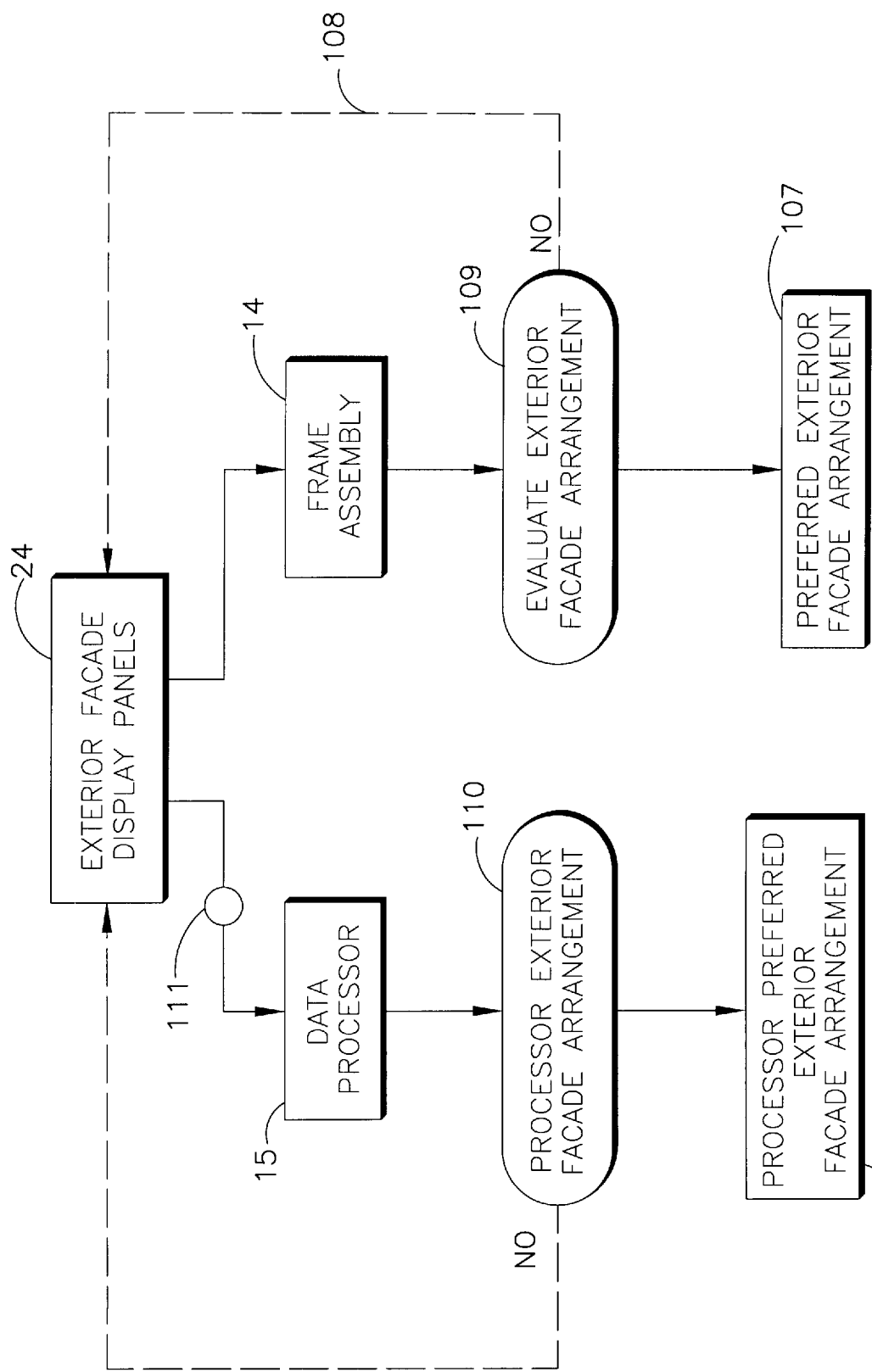
FIG. 15 is a diagram showing the exterior facade arrangement selection process of the present invention.

The floor covering selection process performed in conjunction with the wall covering selection process is shown diagrammatically in FIG. 14. It should be understood that the steps illustrated in FIG. 14 essentially amount to a presentation of the steps illustrated in FIGS. 12 and 13 being performed simultaneously to generate matching floor and wall covering arrangements.

A floor covering panel 23 positioned in a cavity 53 in frame assembly 14, and a wall covering display panel 22 is lowered downwardly until its tab 44 rests on the top 75 of wall 30. The process proceeds substantially as described above, until the purchaser selects a preferred wall and floor covering matching arrangement 97. As in FIGS. 12 and 13, the dashed lines 98 and 99 in FIG. 14 returning from the evaluate wall and floor covering matching arrangement step 100 back to the plurality of wall covering display panels 22 and the floor covering panels 23 represents the interchangeability of wall covering panels and floor covering panels 22 and 23, respectively.

As before, the data processor 15 provides designer arrangements, referred to also as processor wall and floor covering matching arrangements 103, based on data 83 and 93 the purchaser enters that corresponds, respectively, to any one of the wall covering panels 22 and floor covering panels 23. For example, the purchaser enters data 83 corresponding to a certain color of paint and data 93 corresponding to a certain colored tile. The purchaser requests from the processor (interior designer) tone or shade variations of the certain color of paint that match with tone or shade variations of the certain colored tile. The purchaser may obtain from the processor the locating information for the wall covering display panel 22 treated with a shade of the relevant color of paint and the locating information for the shaded variation of the certain colored tile that matches it. The purchaser may then retrieve and insert the computer identified wall covering display panel 22 and the corresponding floor covering panel 23 in frame assembly 14 to view the overall visual impression, (including the changes that are perceptible by touch), that the particular processor wall and floor covering matching arrangement 103 makes. This data entering step may be repeated as many times as necessary, until the purchaser obtains from processor 15 his or her processor preferred (designer) wall and floor covering matching arrangement 104.

With reference to FIGS. 3, 8, 11 and 15, the method of displaying exterior facade arrangements will now be described. Channels 35 in exterior channel members 34 align with and receive side edges 62 of exterior facade display panel 24. Exterior facade display panel 24 is lowered downwardly until securely resting on floor 29 of frame assembly 14, as shown in FIG. 3. The exterior facade display panel 24 is secured in frame assembly 14 and the process proceeds substantially as described above, until the purchaser selects a preferred wall covering arrangement 107. Dashed line 108 returning from the evaluate exterior facade arrangement step 109 back to the exterior facade display panels 24 represents the interchangeability of exterior facade display panels 24.

The data processor 15 provides designer arrangements, referred to also as processor exterior facade arrangements 110, based on data 111 the purchaser enters that corresponds to any one of the exterior facade panels 24. For example, the purchaser may enter data 111 corresponding to a facade panel like the one shown in FIG. 3 with a brick/siding combination and requests from the processor three color selections of the subject siding that are suitable color matches for a certain predetermined brick type. The purchaser may obtain from the processor the locating information corresponding to the three exterior facade display panels 24 that have the three siding colors in combination with the certain predetermined brick type secured to them. The purchaser may then secure those exterior facade display panels 24 in frame assembly 14 and view the overall visual impression those particular processor exterior facade arrangements 110 make. This data entering step may be repeated as many times as necessary, until the purchaser obtains from processor 15 his or her processor preferred (designer) exterior facade arrangement 112.

It should be understood that exterior facades 63 for the sides and rear of scaled-down house 32, may be illustrated by the fluorescent, incandescent, and natural lighting sources 65–67, respectively, to assist the user in determining how a particular facade 63, and/or wall and/or floor arrangement, and their corresponding color scheme will appear under various lighting conditions.

While the invention has been illustrated and described in detail in the drawings and foregoing description, the same is to be considered as illustrative and not restrictive in character, it being understood that only the preferred embodiment and several alternative embodiments have been shown and described and that all changes and modifications that come within the spirit of the invention are desired to be protected.

I claim:

1. A device for displaying room wall and floor covering arrangements for selection by a purchaser, comprising:
    a frame assembly having display panel support means for supporting at least one display panel in a display condition, the frame assembly being configured to resemble, along with at least one supported display panel positioned in the display condition, at least one room;
    at least two surface covering display panels being mutually different in at least one appearance or composition characteristic, such at least one appearance or composition characteristic including at least one of color, pattern, material, texture, and geometrical composition; and,
    wherein said frame assembly includes transparent floor and wall panels through which can be seen a surface covering display panel in the display condition, the transparent floor and wall panels simulating unadorned floor and wall surfaces of the at least one room.

2. The device of claim 1 wherein said at least two surface covering display panels each comprise one of a wall covering and a floor covering.

3. The device of claim 1 wherein said at least two surface covering display panels each comprise one of a wall covering, a floor covering and a roof covering.

4. The device of claim 1 wherein the transparent floor and wall panels are sized and interconnected to define a plurality of rooms such that said frame assembly substantially simulates a scaled-down house.

5. The device of claim 2 wherein the wall covering comprises an interior wall covering.

6. The device of claim 5 wherein the interior wall covering includes a surface comprising one of paint, paper, vinyl, plastic and wood.

7. The device of claim 6 wherein the surface of at least one of said at least two surface covering display panels has a pattern that is a scaled down simulation of a commercially available wall covering.

8. The device of claim 2 wherein the wall covering comprises an exterior wall covering.

9. The device of claim 8 wherein the exterior wall covering includes a surface comprising at least one of paint, siding and brick.

10. The device of claim 2 wherein the floor covering includes a surface comprising one of carpeting, linoleum, refractory, cork and wood.

11. The device of claim 2 wherein said at least two surface covering display panels comprise cards covered with at least one of paint, paper, vinyl, plastic and wood.

12. The device of claim 2 wherein said frame assembly includes a floor and the support means includes a plurality of channel members extending upwardly from the floor, and wherein the channel members are configured to engage with and hold at least one of said at least two surface covering display panels.

13. The device of claim 12 wherein each channel member defines a slot and wherein a pair of mutually facing slots from a mutually adjacent pair of the channel members is juxtaposed to receive and hold at least one of said at least two surface covering display panels.

14. The device of claim 14 wherein said frame assembly includes a substantially transparent floor, and the support means defines at least one cavity below the floor, the cavity being sized and shaped to receive at least one floor covering therein for visualization through the floor.

15. The device of claim 14 wherein the floor covering includes a surface comprising one of carpeting, linoleum, refractory, cork and wood.

16. The device of claim 2 further including lighting means for providing separate lighting directed to said frame assembly.

17. The device of claim 16 wherein said lighting means provides at least two different light sources including a fluorescent light source and an incandescent light source.

18. The device of claim 17 wherein said lighting means includes switch means for selectively activating the at least two different lighting sources.

19. The device of claim 16 further including a cabinet for supporting said frame assembly and said at least two surface covering display panels, and for supporting said lighting means above said frame assembly to direct lighting to said frame assembly.

20. The device of claim 16 wherein there are many of said at least two surface covering display panels which are generally rectangularly-shaped and wherein said cabinet includes shelving structure to hold the many display members in an organized arrangement proximal to said frame assembly.

21. The device of claim 2 wherein said frame assembly has a base and the display panel support means includes at least one pair of channel members extending upwardly from the base, each channel member defining a slot, and the slots of said at least two channel members configured and positioned to receive and hold one of said display panels.

22. The device of claim 2 further including a data processor for storing information relating to the at least two surface covering display panels and for outputting suggested selections of surface covering display panels in response to inputted design specifications.

23. The device of claim 22 further including input means for entering input to said data processor and including display means for displaying output from said data processor.

24. The device of claim 23 wherein said display means is configured to accept and transmit input to said data processor.

25. A method for displaying room wall and floor covering arrangements for consideration and selection by a purchaser, comprising the steps of:
providing a device for displaying wall and floor covering arrangements for selection by a purchaser comprising a frame assembly, the frame assembly having a bottom and room surface panel holding means connected with the bottom for holding at least one room surface display panel, the frame assembly configured to receive and hold room surface display panels to simulate rooms of a substantially scaled-down house;
providing a plurality of room surface display panels comprising at least one of a wall covering display panel, a floor covering display panel and a roof covering display panel, each room surface display panel having a pair of opposite edges and exhibiting a surface covering on at least one side thereof and wherein said frame assembly includes transparent floor and wall panels through which can be seen a surface covering display panel in the display condition, the transparent floor and wall panels simulating unadorned floor and wall surfaces of the at least one room;
positioning at least one room surface display panel in the room surface panel holding means for consideration by a purchaser; and,
interchanging the room surface display panel with other room surface display panels as many times as necessary until the purchaser selects a preferred room surface display panel.

26. The method for displaying room wall and floor covering arrangements of claim 25 wherein said providing a plurality of room surface display panels step includes the room surface display panels including a plurality of wall covering display panels each of which comprises on at least one side one of paint, paper, vinyl, plastic and wood.

27. The method for displaying room wall and floor covering arrangements of claim 25 wherein said providing a plurality of room surface display panels step includes the plurality of room surface display panels including a plurality of floor covering display panels each of which comprises at least one of carpeting, linoleum, refractory, cork and wood.

28. The method for displaying room wall and floor covering arrangements of claim 25 wherein said providing a plurality of room surface display panels step includes the room surface display panels including a plurality of wall covering display panels each of which comprises on at least one side one of paint, paper, vinyl, plastic and wood and including a plurality of floor covering display panels each of which comprises at least one of carpeting, linoleum, refractory, cork and wood, and wherein said positioning step includes positioning at least one wall covering display panel and at least one floor covering display panel in the room surface panel holding means for consideration by a purchaser.

29. The method for displaying room wall and floor covering arrangements of claim 28 further including providing data processing means for storing information relating to the room surface display panels, for receiving input relating to design information and specifications and for outputting suggested selections of room surface display panels in response to inputted design specifications.

30. The method for displaying room wall and floor covering arrangements of claim 29 wherein said providing data processing means further includes input means for entering input to said data processing means and including display means for displaying output from said data processing means.

31. The method for displaying room wall and floor covering arrangements of claim 30 wherein said display means is configured to accept and transmit input to said data processor.

* * * * *